United States Patent
Payan

(10) Patent No.: US 9,525,805 B1
(45) Date of Patent: Dec. 20, 2016

(54) SURVEILLANCE ASSEMBLY

(71) Applicant: Erick Payan, Miami, FL (US)

(72) Inventor: Erick Payan, Miami, FL (US)

( * ) Notice: Subject to any disclaimer, the term of this patent is extended or adjusted under 35 U.S.C. 154(b) by 472 days.

(21) Appl. No.: 13/960,446

(22) Filed: Aug. 6, 2013

(51) Int. Cl.
*H04N 5/232* (2006.01)
*H04N 5/225* (2006.01)

(52) U.S. Cl.
CPC ................................. *H04N 5/2252* (2013.01)

(58) Field of Classification Search
None
See application file for complete search history.

(56) References Cited

U.S. PATENT DOCUMENTS

| | | | |
|---|---|---|---|
| 3,482,037 A | 12/1969 | Brown et al. | |
| 4,833,449 A | 5/1989 | Gaffigan | |
| D307,915 S | 5/1990 | Kuester, III | |
| 5,499,014 A | 3/1996 | Greenwaldt | |
| 5,517,236 A | 5/1996 | Sergeant et al. | |
| 5,946,404 A | 8/1999 | Bakshi et al. | |
| 7,963,707 B2 * | 6/2011 | Jung | G03B 17/00 396/427 |
| 2005/0140785 A1 * | 6/2005 | Mazzilli | B60R 1/12 348/148 |
| 2010/0033577 A1 * | 2/2010 | Doak | H04N 7/181 348/159 |
| 2013/0100292 A1 * | 4/2013 | Mojaver | H04N 5/2251 348/159 |
| 2015/0062337 A1 * | 3/2015 | Scalisi | H04M 1/0291 348/143 |

FOREIGN PATENT DOCUMENTS

CN 101511005 A * 8/2009

* cited by examiner

*Primary Examiner* — Sath V Perungavoor
*Assistant Examiner* — Janese Duley

(57) ABSTRACT

A surveillance assembly provides notification and real time monitoring of activity sensed proximate to one or more positionable cameras. The assembly includes a housing and at least one camera coupled to the housing. A dome is coupled to the housing and extends around each camera. The dome is translucent such that each camera is positionable to monitor an area proximate the housing through the dome. At least one sensor is provided with each sensor being coupled to the housing and directed to the position monitored by an associated camera. A processor is operationally coupled to each sensor and each camera wherein the processor actuates each camera when the associated sensor detects activity in the position monitored by the camera. A transmitter is operationally coupled to the processor and transmits a notification to an extrinsic remote device upon actuation of any camera.

8 Claims, 5 Drawing Sheets

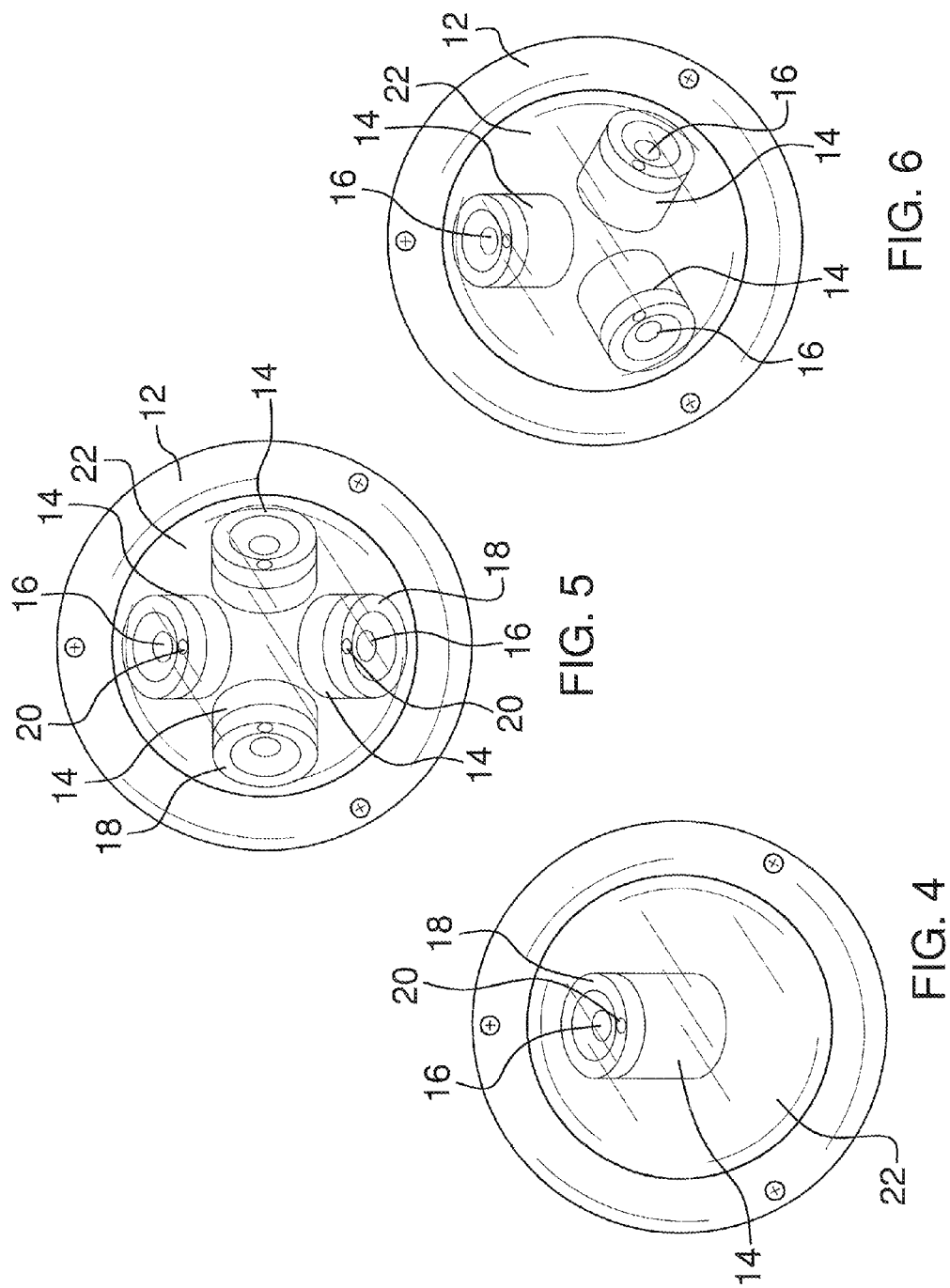

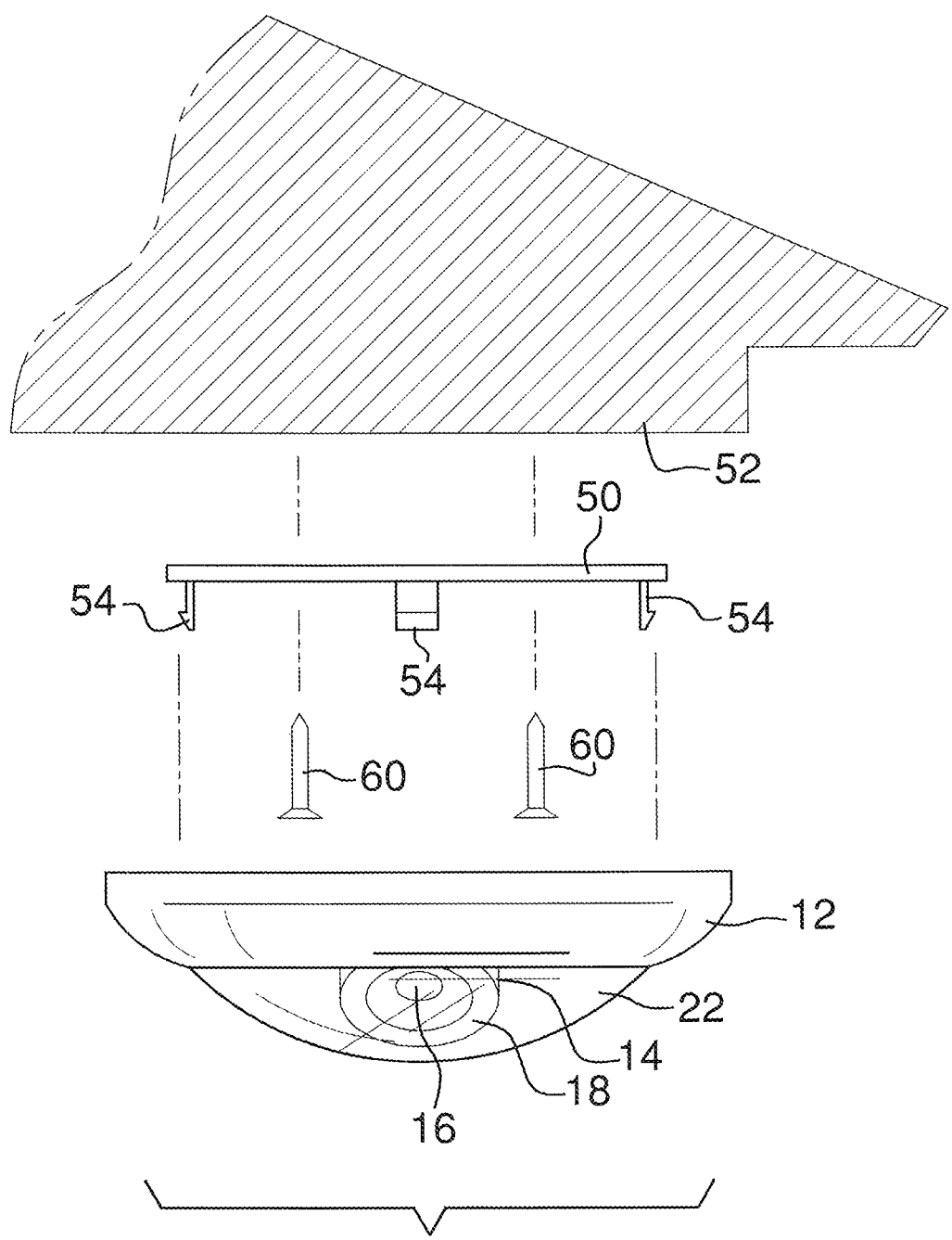

SURVEILLANCE ASSEMBLY

BACKGROUND OF THE DISCLOSURE

Field of the Disclosure

The disclosure relates to surveillance devices and more particularly pertains to a new surveillance device for providing notification and real time monitoring of activity sensed proximate to one or more lenses.

SUMMARY OF THE DISCLOSURE

An embodiment of the disclosure meets the needs presented above by generally comprising a housing and at least one camera coupled to the housing. A dome is coupled to the housing and extends around each camera. The dome is translucent such that each camera is positionable to monitor an area proximate the housing through the dome. At least one sensor is provided with each sensor being coupled to the housing and directed to the position monitored by an associated camera. A processor is operationally coupled to each sensor and each camera wherein the processor actuates each camera when the associated sensor detects activity in the position monitored by the camera. A transmitter is operationally coupled to the processor and transmits a notification to an extrinsic remote device upon actuation of any camera.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a bottom view of an embodiment of the disclosure.

FIG. 5 is a bottom view of an embodiment of the disclosure.

FIG. 6 is a bottom view of an embodiment of the disclosure.

FIG. 7 is a partially exploded side view of an embodiment of the disclosure.

DESCRIPTION OF THE PREFERRED EMBODIMENT

Figure 1:
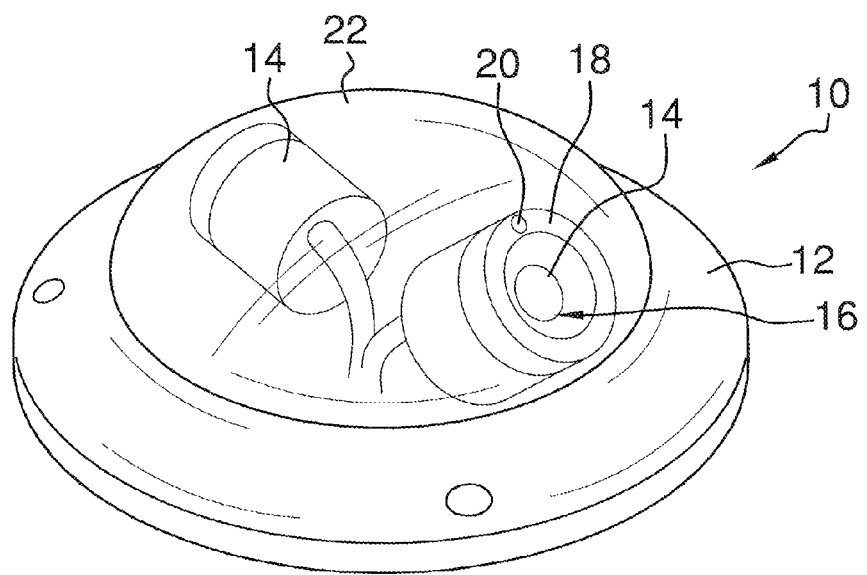
FIG. 1 is a bottom front side perspective view of a surveillance assembly according to an embodiment of the disclosure.
Figure 2:
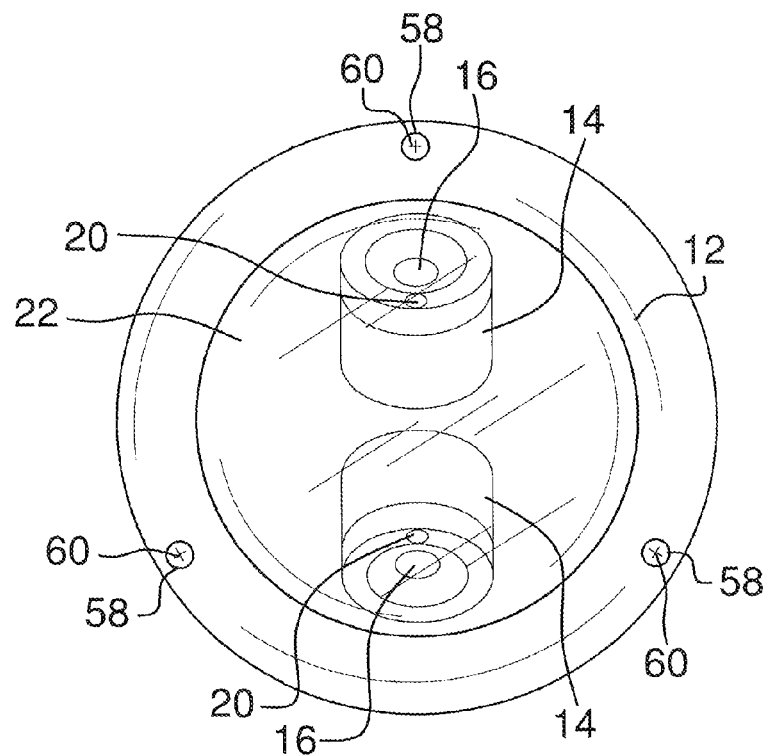
FIG. 2 is a bottom view of an embodiment of the disclosure.
Figure 3:
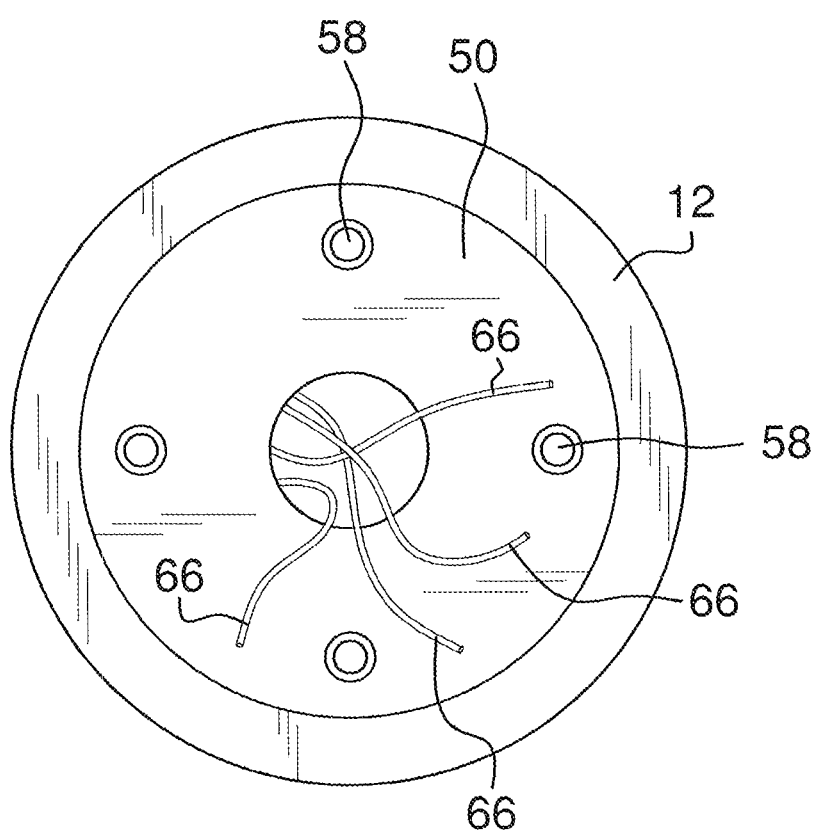
FIG. 3 is a top view of an embodiment of the disclosure.
Figure 8:
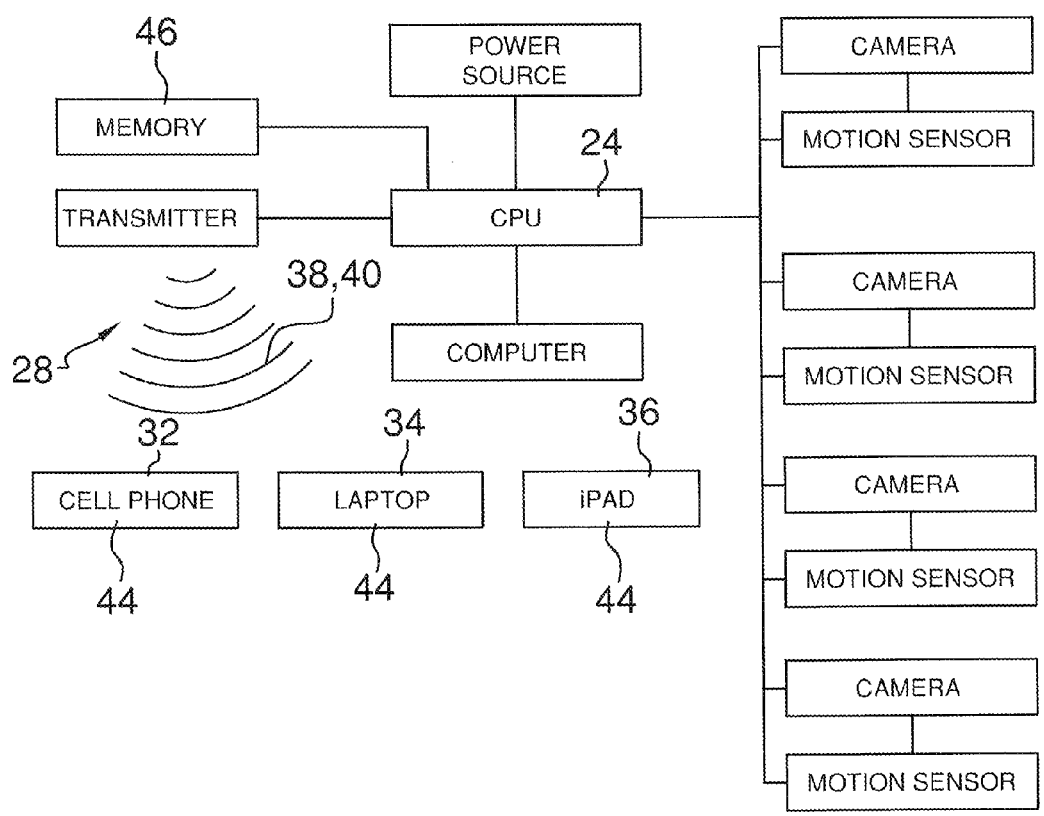
FIG. 8 is a schematic view of an embodiment of the disclosure.

With reference now to the drawings, and in particular to FIGS. 1 through 8 thereof, a new surveillance device embodying the principles and concepts of an embodiment of the disclosure and generally designated by the reference numeral 10 will be described.

As best illustrated in FIGS. 1 through 8, the surveillance assembly 10 generally comprises a housing 12 and at least one camera 14 coupled to the housing 12. The assembly 10 may be provided with one to four cameras 14 depending on range of monitoring desired based on the placement of the housing 12. Each camera 14 has a lens 16 and a rim 18 extending around the lens 16. Two cameras 14 may be positioned to monitor opposite directions for positioning in a long hallway, tunnel, or the like. Three or four cameras 14 may be utilized with the cameras 14 being positioned in a substantially evenly spaced array around the housing 12. The cameras 14 may also be positioned to slightly overlap in coverage of the area surrounding the housing 12 to provide full coverage over a desired field. The cameras 14 may also be provided with night vision technology to monitor effectively in low light conditions.

At least one sensor 20 is provided such as a motion sensor or the like to monitor an area around the housing 12. Each sensor 20 may be coupled to the housing 12 and directed to the position monitored by the cameras 14. Each sensor 20 may be positioned to correspond to and monitor the same area as an associated camera 14 such that each camera 14 has a single associated sensor 20. Each sensor 20 may be positioned on the rim 18 of the associated camera 14.

A dome 22 is coupled to the housing 12 and extends around each camera 14 coupled to the housing 12. The dome 22 is sufficiently translucent such that each camera 14 may be positioned to monitor the area proximate the housing 12 through the dome 22. The dome 22 may be fully transparent. The housing 12 is coupled to a support structure 52 using a substantially planar base 50 configured for coupling to the support structure 52. A plurality of clips 54 may be coupled to and extend from the base 50. Each clip 54 engages the housing 12 wherein the housing 12 is coupled to the base 50. The clips 54 may be offset from a perimeter edge 56 and be inserted through slots in the housing 12 to provide a clean appearance to the connection between the housing 12 and the base 50. A plurality of holes 58 extend through the base 50. Each of a plurality of mounting screws 60 is insertable through an associated one of the holes 58 through the base 50 wherein the base 50 is configured for mounting to the support structure 52 by the mounting screws 60.

A processor 24 may be coupled to and positioned in the housing 12. The processor 24 is operationally coupled to each sensor 20 and each camera 14 to actuate each camera 14 when the associated sensor 20 detects activity in the position monitored by the camera 14. A transmitter 26 is positioned in the housing 12 and operationally coupled to the processor 24 and each camera 14. The transmitter 26 transmits a notification 28 to an extrinsic remote device 44 such as a desktop computer 30, cellular phone 32, laptop computer 34, electronic tablet 36, or the like. The notification 28 may be transmitted upon actuation of any of the cameras 14. The notification 28 may be a text message 38, an electronic mail message 40, or a live image from the camera 14. The transmitter 26 and processor 24 may also be configured to communicate with the remote device 44 to permit control of the cameras 14 to view a selectable one of the cameras 14. The processor 24 may also be extrinsic to the housing 12 and provided in a separate device functionally coupled to each camera 14. The processor 24 may provide a call function option displayed on the remote device 40 wherein the processor 24 transmits an alarm to authorities upon actuation of the call function through the remote device 40.

A memory unit 46 may be provided and operationally coupled to the processor 24. The memory unit 46 may be actuated automatically upon actuation of any of the cameras 14 to record images from the camera 14. The recorded images may be stored for later review on either a semi-permanent or temporary basis. In the event the memory unit 46 periodically records over prior images to preserve storage space, interaction with the remote device 44 may direct the processor 24 to save the images on the memory unit 46 until deletion is explicitly directed in the event the user wishes to preserve the images.

Multiple housings 12 may be employed with either the same or different camera arrangements to provide customizable monitoring of any area. The components within each housing may be hardwired into an electrical system using wiring 66 or each housing 12 may be provided with a dedicated power source and wirelessly coupled to the extrinsic components to transmit notifications and images to achieve the desired results described above.

In use, one or more housings 12 are installed to provide monitoring of a desired area by cameras 14. While activated, the processor 24 will send notification to one or more remote devices 40 selectable by the user. The remote device 44 may be used to manipulate functions of the processor to adjust the cameras 14 or two preserve recordings of the images from the cameras 14. Further, the remote device 44 may incorporate a single push or manipulation actuator 62 to notify authorities that police intervention is requested. Thus, the assembly 10 provides for real time self monitoring of a desired area. Further, the processor 24 may provide a call function option displayed on the remote device 40 wherein the processor 24 transmits an alarm to authorities upon actuation of the call function through the remote device 40. Thus, the user may quickly summon help after viewing images of activities occurring in the monitored area.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A surveillance assembly comprising:
a housing, said housing having a planar face configured for attachment to a horizontal downwardly facing surface;
exactly three cameras coupled to said housing, said cameras being positioned in said housing, said cameras being positioned in a substantially evenly spaced array around a full circumference of said housing, parallel to said planar face of said housing, and being directed outwardly and downwardly relative to a center of said housing;
a dome coupled to said housing and extending around each said camera, said dome being translucent wherein each said camera is positionable to monitor an area proximate said housing through said dome;
at least one sensor, each said sensor being coupled to said housing and directed to the position monitored by an associated said camera;
a processor operationally coupled to each said sensor and each said camera wherein said processor actuates each said camera when said associated sensor detects activity in the position monitored by said camera; and
a transmitter operationally coupled to said processor, said transmitter transmitting a notification to an extrinsic remote device upon actuation of any said camera.

2. The assembly of claim 1, further comprising:
a substantially planar base configured for coupling to a support structure; and
a plurality of clips coupled to and extending from said base, each said clip engaging said housing wherein said housing is coupled to said base.

3. The assembly of claim 2, further comprising:
a plurality of holes extending through said base; and
a plurality of mounting screws, each said mounting screws being insertable through an associated one of said holes through said base wherein said base is configured for mounting to the support structure by said mounting screws.

4. The assembly of claim 1, further comprising each said camera having a lens and a rim extending around said lens, said associated sensor being positioned on said rim.

5. The assembly of claim 1, further comprising said notification being a live image from said camera to an extrinsic remote monitor upon actuation of said camera.

6. The assembly of claim 1, further comprising said notification being a text message.

7. The assembly of claim 1, further comprising said notification being an electronic mail message.

8. A surveillance assembly comprising:
a housing, said housing having a planar face configured for attachment to a horizontal downwardly facing surface;
exactly three cameras coupled to said housing, said cameras being positioned in said housing, said cameras being positioned in a substantially evenly spaced array around a full circumference of said housing, parallel to said planar face of said housing, and being directed outwardly and downwardly relative to a center of said housing, each said camera having a lens and a rim extending around said lens;
a dome coupled to said housing and extending around each said camera, said dome being translucent wherein each said camera is positionable to monitor an area proximate said housing through said dome;
at least one sensor, each said sensor being coupled to said housing and directed to the position monitored by an associated said camera, each said sensor being positioned on said rim of said associated camera;
a processor operationally coupled to each said sensor and each said camera wherein said processor actuates each said camera when said associated sensor detects activity in the position monitored by said camera;

a transmitter operationally coupled to said processor, said transmitter transmitting a notification to an extrinsic remote device upon actuation of any said camera;

a substantially planar base configured for coupling to a support structure;

a plurality of clips coupled to and extending from said base, each said clip engaging said housing wherein said housing is coupled to said base;

a plurality of holes extending through said base; and a plurality of mounting screws, each said mounting screws being insertable through an associated one of said holes through said base wherein said base is configured for mounting to the support structure by said mounting screws.

* * * * *